(12) United States Patent
Zhang et al.

(10) Patent No.: US 12,156,771 B2
(45) Date of Patent: Dec. 3, 2024

(54) NOZZLE FIXING ASSEMBLY AND WATER PICK

(71) Applicant: Nicefeel Medical Device Technology Co., Ltd., Shenzhen (CN)

(72) Inventors: Qing Zhang, Shenzhen (CN); Xiaowen Liu, Shenzhen (CN); Jinfeng Li, Shenzhen (CN); Xinquan Liu, Shenzhen (CN); Gang Zhou, Shenzhen (CN); Gang Wang, Shenzhen (CN)

( * ) Notice: Subject to any disclaimer, the term of this patent is extended or adjusted under 35 U.S.C. 154(b) by 974 days.

(21) Appl. No.: 17/139,971

(22) Filed: Dec. 31, 2020

(65) Prior Publication Data

US 2021/0322140 A1    Oct. 21, 2021

(30) Foreign Application Priority Data

Apr. 17, 2020   (CN) .......................... 202010305438.6

(51) Int. Cl.
*A61C 17/02*        (2006.01)
*A61H 13/00*        (2006.01)
*B05B 15/65*        (2018.01)

(52) U.S. Cl.
CPC .......... *A61C 17/0202* (2013.01); *B05B 15/65* (2018.02); *A61H 13/005* (2013.01)

(58) Field of Classification Search
CPC ........ A61H 13/005; B05B 15/65; B05B 9/01; A61C 17/0202
See application file for complete search history.

(56) References Cited

U.S. PATENT DOCUMENTS

| | | | | | |
|---|---|---|---|---|---|
| 3,851,643 | A | * | 12/1974 | Musy ................... | A61C 17/028 601/162 |
| 4,146,020 | A | * | 3/1979 | Moret ................. | F15B 15/1476 601/162 |
| 5,125,835 | A | * | 6/1992 | Young ................ | A61C 17/0202 433/80 |
| 5,286,065 | A | * | 2/1994 | Austin ............... | A61C 17/0202 285/23 |
| 2015/0147717 | A1 | * | 5/2015 | Taylor ................. | A61C 1/0092 433/80 |
| 2017/0361348 | A1 | * | 12/2017 | Chiang ..................... | B05B 9/01 |

\* cited by examiner

*Primary Examiner* — Valerie L Woodward
(74) *Attorney, Agent, or Firm* — Xia Li (57) ABSTRACT

The present disclosure relates to a nozzle fixing assembly and a water pick. The nozzle fixing assembly is configured to mount a nozzle having a limiting groove. The nozzle fixing assembly includes: a locking assembly including a housing provided with a first through hole and an elastic element connected to the housing; a support base including an elastic piece and a locking sleeve provided with a second through hole. An outer periphery of the locking sleeve is provided with a latching groove in communication with the second through hole. The nozzle extends through the first through hole and the second through hole and biases the elastic element, such that the limiting groove is aligned with the latching groove, the elastic piece is engaged in the limiting groove and the latching groove.

10 Claims, 5 Drawing Sheets

NOZZLE FIXING ASSEMBLY AND WATER PICK

CROSS-REFERENCE TO RELATED APPLICATIONS

The present application claims priority to Chinese patent application No. 2020103054386, filed on Apr. 17, 2020, the entire content of which is incorporated herein by reference.

TECHNICAL FIELD

The present disclosure relates to a field of water pick technology, in particular, to a nozzle fixing assembly and a water pick.

BACKGROUND

As people pay more and more attention to oral hygiene, they pay more and more attention to oral cleaning. Brushing is the most common type of dental health care. However, most toothbrushes cannot allow toothpaste to penetrate into crevices, grooves and cracks of an occlusal surface. Therefore, a water pick is needed as an auxiliary tool of the toothbrush to clean teeth. In one of the embodiments, a water pick is provided. The water pick is used as a new auxiliary appliance for oral cleaning, which is mainly used by high-speed fluid flowing out from a nozzle of the water pick to directly impact user's gums or teeth, thereby using the impact of high-speed fluid to achieve oral cleaning.

For conventional hand-held water pick, when a nozzle is mounted in a main body of the water pick, the nozzle is fixed with a nozzle engaging device on the main body. Due to the high requirements for the mounting accuracy of the nozzle and the main body, when the nozzle is assembled with the main body, it is easy to cause the mounting between the nozzle and the main body to be unstable, and cause the nozzle to shake.

SUMMARY

According to various embodiments, a nozzle fixing assembly and a water pick are provided.

A nozzle fixing assembly is configured to mount a nozzle having a limiting groove. The nozzle fixing assembly includes: a locking assembly including a housing provided with a first through hole and an elastic element connected to the housing; and a support base including an elastic piece and a locking sleeve provided with a second through hole, wherein an outer periphery of the locking sleeve is provided with a latching groove in communication with the second through hole. The nozzle extends through the first through hole and the second through hole and biases the elastic element, such that the limiting groove is aligned with the latching groove, the elastic piece is engaged in the limiting groove and the latching groove.

In one of the embodiments, the locking assembly further includes a movable plate connected to the elastic element and accommodated in the first through hole. The movable plate is provided with a guiding hole in communication with the first through hole. The nozzle extends through the guiding hole and abuts against the movable plate to bias the elastic element.

In one of the embodiments, the housing includes an upper housing and a lower housing. The elastic element is connected to the lower housing and accommodated in the first though groove. The first through hole includes a first opening in the upper housing, and a second opening in the lower housing. The locking sleeve extends through the second opening. The nozzle extends into the first through hole via the first opening and press the movable plate.

In one of the embodiments, a side of the lower housing facing the upper housing is provided with a first convex ring. The first convex ring surrounding the second opening. The elastic element is sleeved on the first convex ring and is stretchable along the first convex ring. The first convex ring is capable of restricting a moving range of the movable plate.

In one of the embodiments, a side of the upper housing facing the lower housing is provided with a second convex ring surrounding the first opening. The second convex ring is sleeved on the movable plate to restrict a moving range of the movable plate.

In one of the embodiments, the lower housing is provided with a positioning groove, the upper housing is provided with a positioning post engaged in the positioning groove.

In one of the embodiments, the lower housing is further provided with an engaging groove, a side of the upper housing facing the lower housing is provided with a hook engaged in the engaging groove.

In one of the embodiments, the support base further includes a water inlet sleeve. The water inlet sleeve is connected to the locking sleeve and has a cavity in communication with a passage of the nozzle.

In one of the embodiments, the support base further includes a sealing ring located between the water inlet sleeve and the nozzle.

A water pick includes a nozzle having a limiting groove; a nozzle fixing assembly; and a water pump assembly connected to the locking sleeve and capable of pumping water into the nozzle. The nozzle fixing assembly includes a locking assembly including a housing provided with a first through hole and an elastic element connected to the housing; and a support base including an elastic piece and a locking sleeve provided with a second through hole, wherein an outer periphery of the locking sleeve is provided with a latching groove in communication with the second through hole; wherein the nozzle extends through the first through hole and the second through hole and biases the elastic element, such that the limiting groove is aligned with the latching groove, the elastic piece is engaged in the limiting groove and the latching groove.

In one of the embodiments, the nozzle includes a connecting portion and a water spraying portion connected to the connecting portion. An end of the water spraying portion adjacent to the connecting portion forms an expanding portion. The limiting groove is provided in the connecting portion. The connecting portion extends through the first through hole and extends into the second through hole. The expanding portion is capable of pressing the movable plate.

For the above nozzle fixing assembly, when the user mounts the nozzle on the support base, the user can insert a portion of the nozzle into the guiding hole, and abuts the other portion of the nozzle against the elastic element. The user applies a downward force to the nozzle to cause the portion of the nozzle to bias the elastic element, such that the elastic element is elastically deformed. At this time, the nozzle accommodated in the guiding hole can move downward, and move to a position where the elastic piece is engaged in the limiting groove and the latching groove, so as to assemble the nozzle and the support base. When the nozzle is assembled with the support base, the user releases the nozzle, and the elastic element applies an upward force to the nozzle, such that the elastic piece abuts against a groove wall of the latching groove, preventing the nozzle from shaking in the support base. During the aforementioned process, the nozzle biases the elastic element to adjust an assembling clearance between the nozzle and the support base, so as to expose the limiting groove in the latching groove. That is, a surface of the limiting groove is coplanar with a surface of the latching groove. Thus, the elastic piece can be engaged in the limiting groove and the latching groove, so as to assemble the nozzle and the support base in position, and to achieve a stable mounting.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

It should be noted that when an element is referred to as being "fixed to" another element, it may be directly on another element or there may also be an intermediate element therebetween. When an element is considered to be "connected" to another element, it can be directly connected to another element or there may be an intermediate element at the same time. The terms "vertical", "horizontal", "left", "right" and the like used herein are only for illustrative purposes.

Unless otherwise defined, all technical and scientific terms used herein have the same meaning as commonly understood by those skilled in the technical field of the present disclosure. The terms used in the specification of the present disclosure herein are only for the purpose of describing specific embodiments, and are not intended to limit the present disclosure. The term "and/or" as used herein includes any and all combinations of one or more related listed items.

Figure 1:
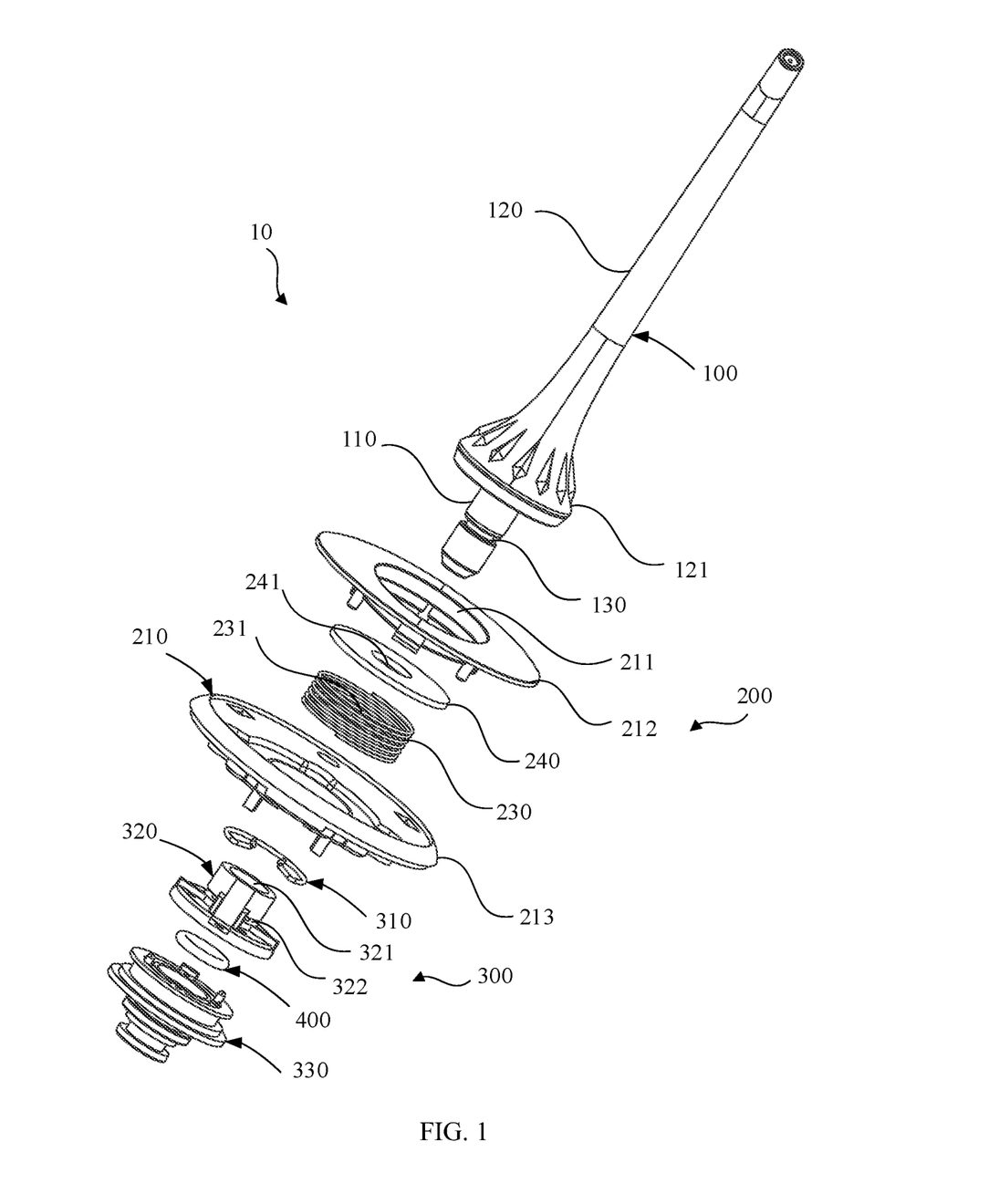
FIG. 1 is an exploded view of a portion of a water pick according to an embodiment.

Referring to FIG. 1, according to one of the embodiments, a water pick includes a nozzle 100, a main body, and a nozzle fixing assembly 10. The main body includes a water pump assembly for pumping cleaning liquid, such as water. The water pump assembly can be connected to the nozzle fixing assembly 10. The nozzle 100 is detachable connected to the nozzle fixing assembly 10. Specifically, the water pump assembly can pump the cleaning liquid stored in a water tank into the nozzle fixing assembly 10, and then the cleaning liquid such as water is sprayed out from the nozzle 100 via the nozzle fixing assembly 10, and thus the sprayed water can be used to clean an oral cavity. It should be understood that during use, the user can directly place a water outlet of the nozzle 100 close to the teeth or gums, or keep a relatively close distance between the water outlet of the nozzle 100 and the teeth or the gums, such that the water sprayed from the water outlet of the nozzle 100 maintains a high-speed impact force, so as to achieve the oral cleaning.

Figure 2:
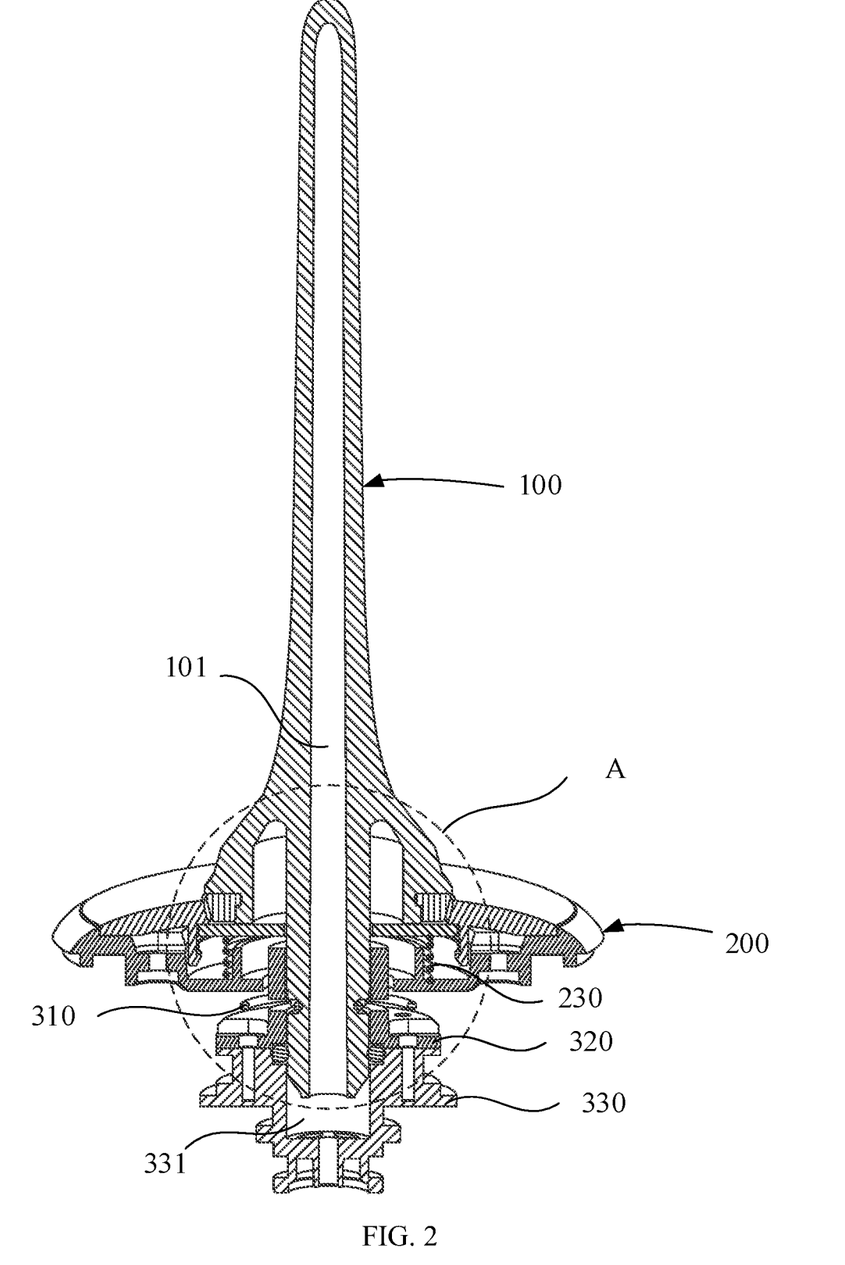
FIG. 2 is a cross-sectional view of the water pick shown in FIG. 1.

Referring to FIGS. 1 and 2, according to one of the embodiments, the nozzle fixing assembly 10 includes a locking assembly 200 and a support base 300 connected to the locking assembly 200. The nozzle 100 can extend through the locking assembly 200 and be fixedly connected to the support base 300. The water pumped by the water pump assembly can be sprayed out from the water outlet of the nozzle 100 via the support base 300 and the locking assembly 200. According to one of the embodiments, the locking assembly 200 includes a housing 210 and an elastic element 230. The housing 210 has a first through hole 211. The elastic element 230 is made of a material with certain elasticity and can be elastically deformed. The elastic element 230 is connected to the housing 210 and is accommodated in the first through hole 211. The elastic element 230 is provided with a guiding channel 231. The guiding channel 231 and the first through hole 211 is in communication with each other in an axial direction, such that the nozzle 100 can extend through the guiding channel 231 and the first through hole 211. It can be understood that a size of the guiding channel 231 is similar to an outer diameter of the nozzle 100, such that when the nozzle 100 extends through the guiding channel 231, the nozzle 100 will be well positioned.

Figure 3:
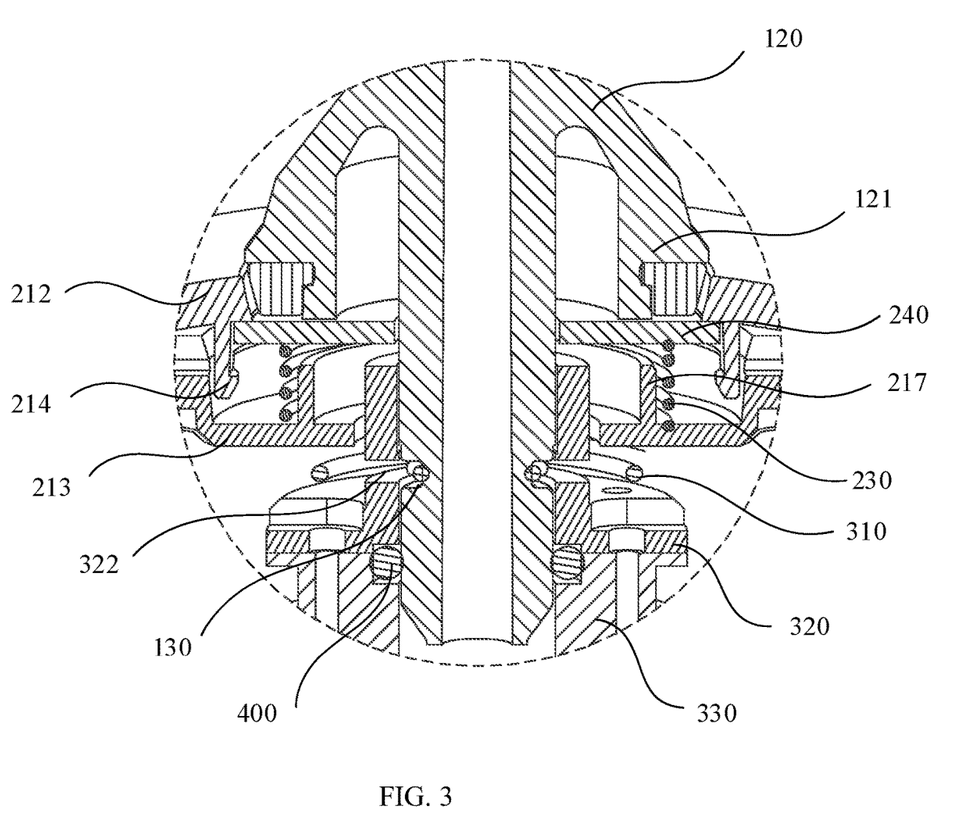
FIG. 3 is an enlarged view of a portion A of FIG. 2.

Referring to FIGS. 1, 2 and 3, according to one of the embodiments, the nozzle 100 includes a connecting portion 110 and a water spraying portion 120 connected to the connecting portion 110. The connecting portion 110 may be in a columnar, cylindrical or prismatic shape, and may extend through the guiding channel 231. An end of the water spraying portion 120 adjacent to the connecting portion 110 forms an expanding portion 121. The maximum width of a cross-section of the expanding portion 121 is greater than the maximum width of a cross-section of the connecting portion 110.

Figure 4:
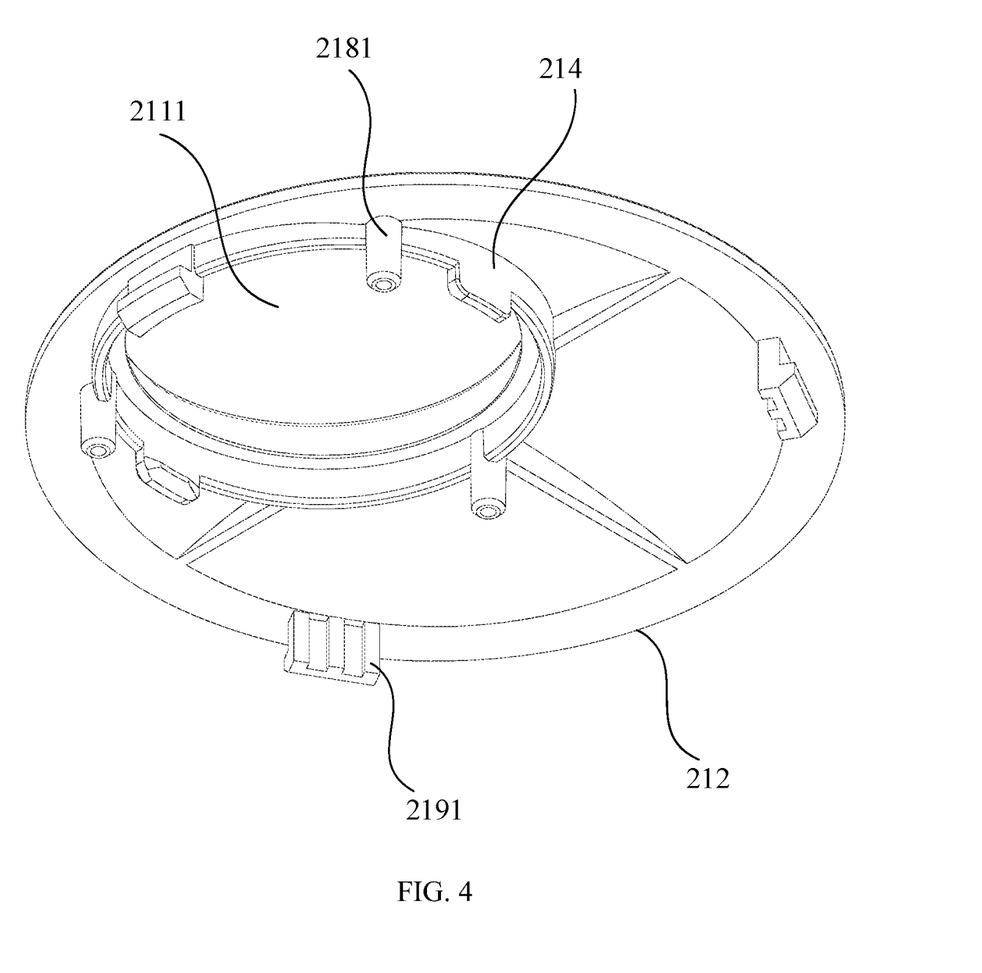
FIG. 4 is a perspective view of an upper housing of the water pick shown in FIG. 1.
Figure 5:
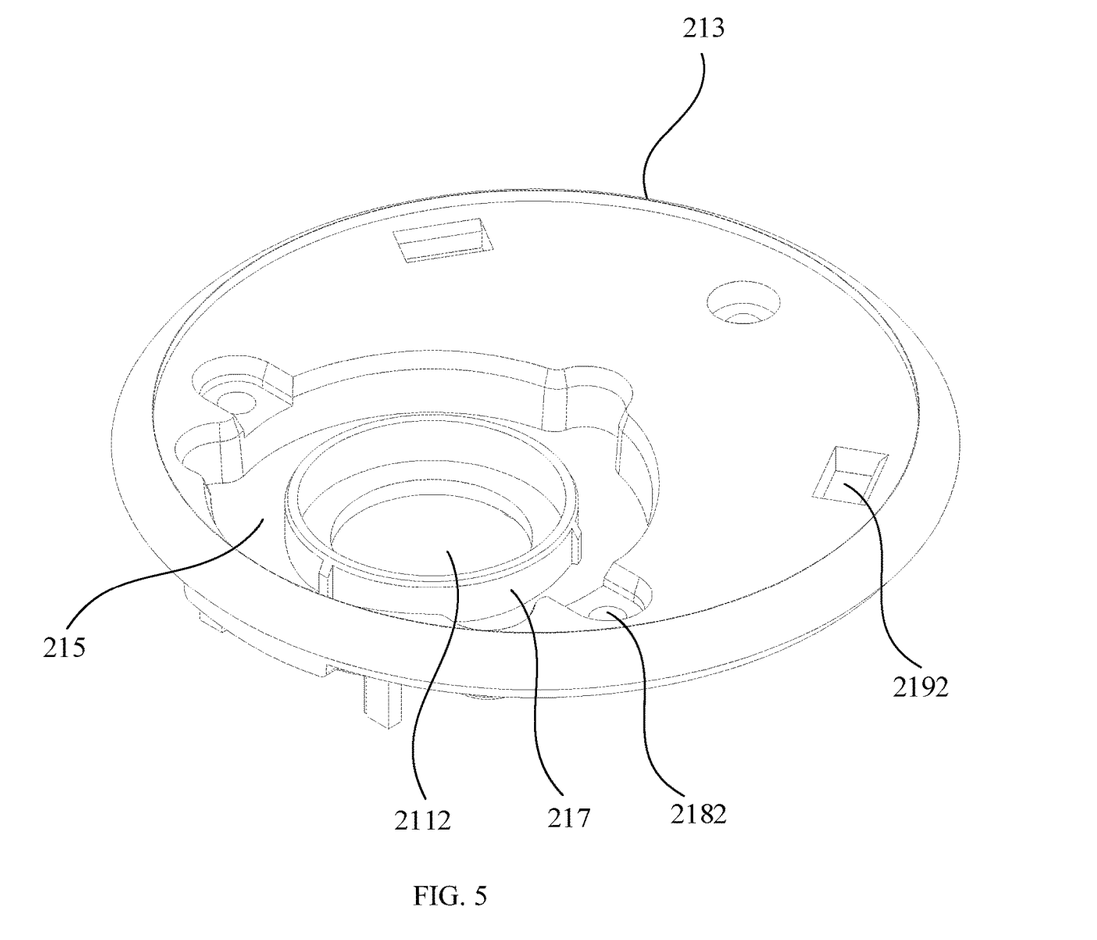
FIG. 5 is a perspective view of a lower housing of the water pick shown in FIG. 1.

Referring to FIGS. 1, 4 and 5, according to one of the embodiments, the housing 210 includes an upper housing 212 and a lower housing 213. The upper housing 212 is shaped substantially as a disk. The first through hole 211 includes a first opening 2111 formed on the upper housing 212, and a second opening 2112 formed on the lower housing 213. Specifically, the elastic element 230 is accommodated in the first through hole 211. One end of the elastic element 230 is connected to the upper housing 212, and the other end of the elastic element 230 is connected to the lower housing 213. When the connecting portion 110 of the nozzle 100 extends through the guiding channel 231, the expanding portion 121 of the nozzle 100 will bias the elastic element 230, such that the elastic element 230 is deformed and the connecting portion 110 can move downward and be fixedly connected with the support base 300. Specifically, a side of the upper housing 212 facing the lower housing 213 is provided with a hook 2191, and the lower housing 213 is further provided with an engaging groove 2192. When the upper housing 212 is assembled to the lower housing 213, the hook 2191 is engaged in the engaging groove 2192, so as to fix the upper housing 212 to the lower housing 213. In one embodiment, a side of the upper housing 212 facing the lower housing 213 is provided with a positioning post 2181, and the lower housing 213 is correspondingly provided with a positioning groove 2182 to receive the positioning post 2181. Providing the positioning post 2181 and the positioning groove 2182 can provide an accurate positioning between the upper housing 212 and the lower housing 213 during their assembling. In one embodiment, a plurality of the hooks 2191 and a plurality of the positioning posts 2181 may be provided, and a plurality of the engaging grooves 2192 and a plurality of positioning grooves 2182 are correspondingly provided. The numbers and positions of the positioning posts 2181 and the positioning grooves 2182 are matched with each other, such that the upper housing 212 and the lower housing 213 can be assembled more stably and firmly.

Referring to FIGS. 1 and 3, according to one of the embodiments, the locking assembly 200 includes a movable plate 240 connected to the elastic element 230 and accommodated in the first through hole 211. An end of the elastic element 230 away from the movable plate 240 is connected to the lower housing 213, and an end of the movable plate 240 away from the elastic element 230 can abut against the upper housing 212. The movable plate 240 is substantially shaped as a disc and is provided with a guiding hole 241 in a middle portion thereof that is in communication with the first through hole 211. A size of the guiding hole 241 and a size of the connecting portion 110 are adapted to each other, such that the nozzle 100 can extend through the guiding hole 241 and be relatively stably mounted on the movable plate 240. When the nozzle 100 is mounted on the nozzle fixing assembly 10, the user first inserts the connecting portion 110 of the nozzle 100 into the guiding hole 241, such that the expanding portion 121 of the water spraying portion 120 can be in contact with the elastic element 230. When the user applies a force to the nozzle 100 towards the elastic element 230, the expanding portion 121 will bias the elastic element 230, and thus the elastic element 230 is elastically deformed. The connecting portion 110 then moves downward into the support base 300, thereby achieving a fixed connection between the connecting portion 110 and the support base 300. After the connecting portion 110 is connected to the support base 300, the user releases the nozzle 100, and the elastic element 230 restores the elastic force and drives the movable plate 240 to abut against the upper housing 212 again. At that time, the movable plate 240 is fixed to the upper housing 212. Since the nozzle 100 is mounted on the movable plate 240, the position of the nozzle 100 on the housing 210 is also restricted at this time, thereby preventing the nozzle 100 from shaking relative to the upper housing 212.

Referring to FIGS. 3, 4 and 5, according to one of the embodiments, the side of the upper housing 212 facing the lower housing 213 is provided with a second convex ring 214. The second convex ring 214 is substantially in a ring shape and defines the first through hole 211. The second convex ring 214 surrounds the first opening 2111 and is spaced apart from the first opening 2111. The maximum cross-sectional size of the second convex ring 214 is greater than or equal to that of the movable plate 240, such that when the movable plate 240 abuts against the upper housing 212, the second convex ring 214 can effectively limit the lateral movement of the movable plate 240, such that the movable plate 240 can abut against the upper housing 212 more stably, and the nozzle 100 sleeved on the movable plate 240 is not easy to be shaken.

According to one of the embodiments, a side of the lower housing 213 facing the upper housing 212 is provided with a first convex ring 217. The first convex ring 217 is substantially in a ring shape. The first convex ring 217 surrounds the second opening 2112. The cross-sectional size of the first convex ring 217 is slightly less than the cross-sectional size of the elastic element 230, such that when the elastic element 230 is connected to the lower housing 213, the elastic element 230 can be sleeved on the first convex ring 217 and is stretchable along the first convex ring 217. Therefore, the first convex ring 217 can restrict the longitudinal movement of the elastic element 230. Specifically, when the nozzle 100 is not mounted on the nozzle fixing assembly 10, the elastic element 230 is in an initial state. When the elastic element 230 is in a compressed state, it applies an upward force to the movable plate 240, such that the movable plate 240 can abut against the upper housing 212. Moreover, the height of the elastic element 230 in this state is greater than the height of the first convex ring 217, such that when the movable plate 240 biases the elastic element 230, the elastic element 230 will be compressed and reach a position coplanar with the surface of the first convex ring 217. Accordingly, a compressing range of the elastic element 230 is the moving range of the movable plate 240.

Specifically, when the user mounts the nozzle 100, the user can insert the connecting portion 110 into the guiding hole 241. The expanding portion 121 of the nozzle 100 presses the movable plate 240, and the movable plate 240 biases the elastic element 230, such that the elastic element 230 is compressed and deformed, and the movable plate 240 can move downward. During the compression of the elastic element 230, due to the restriction of the first convex ring 217, the elastic element 230 can be compressed in a height direction of the first convex ring 217, such that the elastic element 230 is not easy to be shaken. When the movable plate 240 compresses the elastic element 230 to cause that the elastic element 230 is coplanar with the surface of the first convex ring 217, the movable plate 240 will not move. In this way, the connecting portion 110 can be connected to the support base 300. It can be understood that the connecting portion 110 may be connected to the support base 300 during the compression of the elastic element 230. That is, when the elastic element 230 is not coplanar with the surface of the first convex ring 217, the connecting portion 110 may also be connected to the support base 300. Furthermore, when the connecting portion 110 is connected to the support base 300, the user will not press the movable plate 240, and the elastic element 230 restores its deformation. That is, the elastic element 230 restores its deformation in the height direction of the first convex ring 217, which is beneficial for the elastic element 230 to stably move the movable plate 240 to a position where the movable plate 240 abuts against the upper housing 212, such that the movable plate 240 is fixed to the upper housing 212, thereby restricting the displacement of the nozzle 100. Providing the first convex ring 217 is beneficial for the elastic element 230 to be relatively stable during the process of compression or restoring its deformation. That is, the elastic element 230 can move along a straight line during the process of compression or restoring its deformation, and thus it is not easy to be shaken, which is beneficial for the elastic element 230 to drive the movable plate 240 to move stably, such that the movable plate 240 abuts against the upper housing 212 and is accommodated in an accommodating groove 215.

Referring to FIGS. 1 and 3, according to one of the embodiments, the support base 300 includes an elastic piece 310 and a locking sleeve 320. The locking sleeve 320 is provided with a second through hole 321 in a middle portion thereof. The second through hole 321 has a similar shape and size to that of the connecting portion 110 of the nozzle 100. An outer periphery of the locking sleeve 320 is laterally provided with a latching groove 322. The second through hole 321 is in communication with the latching groove 322. The elastic piece 310 is accommodated in the latching groove 322. Since the elastic piece 310 has certain elasticity and is substantially in a C shape, when the elastic piece 310 is in the initial state, a portion of the elastic piece 310 is accommodated in the latching groove 322, and the other portion of the elastic piece 310 extends into the second through hole 321. In the illustrated embodiment, the elastic piece 310 is a circlip. Specifically, a portion of the locking sleeve 320 can extend through the second opening 2112 of the lower housing 213, and a cross-sectional size of the second opening 2112 and an outer diameter size of the locking sleeve 320 are adapted to each other. When the connecting portion 110 extends through the guiding hole 241 and extends into the second through hole 321, the elastic piece 310 can be fixedly connected to the connecting portion 110. Specifically, an outer periphery of the connecting portion 110 is provided with a limiting groove 130, which is substantially in a ring shape. When the connecting portion 110 moves into the second through hole 321, firstly, the limiting groove 130 moves to a position aligned with the latching groove 322. That is, a surface of the limiting groove 130 is coplanar with a surface of the latching groove 322 at this time. Then, the connecting portion 110 continues to move until the portion of the elastic piece 310 can be engaged in the limiting groove 130 and the latching groove 322 simultaneously, thereby achieving a fixed connection between the connecting portion 110 and the elastic piece 310.

Specifically, when the user mounts the nozzle 100 on the support base 300, the user can firstly insert the connecting portion 110 of the nozzle 100 through the guiding hole 241 and into the second through hole 321, such that the expanding portion 121 of the nozzle 100 presses the movable plate 240. The user applies a downward force to the nozzle 100 to cause the expanding portion 121 to press the movable plate 240, so as to bias the elastic element 230, and thus the elastic element 230 is elastically deformed. At this time, the connecting portion 110 can move downward to open the elastic piece 310 to a certain extent. The elastic piece 310 can surround the outer periphery of the connecting portion 110. When the elastic piece 310 is engaged with the limiting groove 130, the nozzle 100 is fixedly connected to the support base 300. After the nozzle 100 is assembled with the support base 300, the user releases the nozzle 100, and the elastic element 310 restores its deformation, and applies an upward force to the nozzle 100, such that the elastic piece 310 tightly abuts against the latching groove 322, thus preventing the elastic piece 310 from shaking in the latching groove 322. Meanwhile, the movable plate 240 abuts against the upper housing 212 and is accommodated in the accommodating groove 215. The elastic element 310 restricts the movement of the movable plate 240 in the axial direction, and the accommodating groove 215 restricts the movement of the movable plate 240 in a radial direction, such that the positions of the movable plate 240 and the upper housing 212 are relatively fixed, and the nozzle 100 is fixed in the housing 210. Therefore, the nozzle 100 is stably assembled with the nozzle fixing assembly 10, thereby effectively preventing the nozzle 100 from shaking relative to the housing 210.

According to one of the embodiments, the support base 300 further includes a water inlet sleeve 330. One end of the water inlet sleeve 330 is connected to the locking sleeve 320, the other end of the water inlet sleeve 330 is fixedly connected to the water pump assembly of the main body. The water inlet sleeve 330 has a cavity 331 in communication with a passage 101 of the nozzle 100. A water outlet of the water inlet sleeve 330 is in communication with the second through hole 321 of the locking sleeve 320. The water pump assembly can pump the cleaning liquid out of the water tank, such that water enters the water inlet sleeve 330 via the water inlet of the water inlet sleeve 330 and flows to the second through hole 321 of the locking sleeve 320, and flows into the nozzle 100 from the second through hole 321, and then sprayed out from the water outlet of the nozzle 100. The sprayed water can clean the user's oral cavity. According to one of the embodiments, the support base 300 further includes a sealing ring 400 located between the water inlet sleeve 330 and the nozzle 100. The sealing ring 400 may be made of flexible material such as silicon. The sealing ring 400 is sleeved on the nozzle 100, so as to seal a gap between the water inlet sleeve 330 and the nozzle 100. Furthermore, a portion of the sealing ring 400 is connected to an inner wall of the water inlet sleeve 330 in a sealed manner, the other portion of the sealing ring 400 is connected to an inner wall of the locking sleeve 320 in a sealed manner. The sealing ring 400 can effectively prevent the water from flowing out from the gap between the water inlet sleeve 330 and the locking sleeve 320, and thus prevents other components of the main body from being damaged caused by the water flowing into the main body.

The technical features of the aforementioned embodiments can be combined arbitrarily. In order to simply the description, all possible combinations of the technical features in the aforementioned embodiments are not described. However, as long as there is no contradiction in the combinations of these technical features, they should be considered to be fallen into the range described in the present specification.

Only several implementations of the present disclosure are illustrated in the aforementioned embodiments, and the description thereof is relatively specific and detailed, but it should not be understood as a limitation on the scope of the present disclosure. It should be noted that for those of ordinary skill in the art, without departing from the concept of the present disclosure, several modifications and improvements can be made, which all fall within the protection scope of the present disclosure. Therefore, the protection scope of the present disclosure shall be subject to the appended claims.

What is claimed is:

1. A nozzle fixing assembly configured to mount a nozzle having a limiting groove, the nozzle fixing assembly comprising:
   a locking assembly comprising a housing provided with a first through hole and an elastic element connected to the housing; and
   a support base comprising an elastic piece and a locking sleeve provided with a second through hole, wherein an outer periphery of the locking sleeve is provided with a latching groove in communication with the second through hole;
   wherein the nozzle extends through the first through hole and the second through hole and biases the elastic element, such that the limiting groove is aligned with the latching groove, the elastic piece is engaged in the limiting groove and the latching groove; and wherein the locking assembly further comprises a movable plate connected to the elastic element and accommodated in the first through hole, the movable plate is provided with a guiding hole in communication with the first through hole, the nozzle extends through the guiding hole and abuts against the movable plate to bias the elastic element.

2. The nozzle fixing assembly according to claim 1, wherein the housing comprises an upper housing and a lower housing, the elastic element is connected to the lower housing and accommodated in the first though groove, the first through hole comprises a first opening in the upper housing and a second opening in the lower housing, the locking sleeve extends through the second opening, and the nozzle extends into the first through hole via the first opening and press the movable plate.

3. The nozzle fixing assembly according to claim 2, wherein a side of the lower housing facing the upper housing is provided with a first convex ring surrounding the second opening, the elastic element is sleeved on the first convex ring and is stretchable along the first convex ring, and the first convex ring is capable of restricting a moving range of the movable plate.

4. The nozzle fixing assembly according to claim 2, wherein a side of the upper housing facing the lower housing is provided with a second convex ring surrounding the first opening, the second convex ring is sleeved on the movable plate to restrict a moving range of the movable plate.

5. The nozzle fixing assembly according to claim 2, wherein the lower housing is provided with a positioning groove, the upper housing is provided with a positioning post engaged in the positioning groove.

6. The nozzle fixing assembly according to claim 2, wherein the lower housing is further provided with an engaging groove, a side of the upper housing facing the lower housing is provided with a hook engaged in the engaging groove.

7. The nozzle fixing assembly according to claim 1, wherein the support base further comprises a water inlet sleeve connected to the locking sleeve, the water inlet sleeve has a cavity in communication with a passage of the nozzle.

8. The nozzle fixing assembly according to claim 7, wherein the support base further comprises a sealing ring located between the water inlet sleeve and the nozzle.

9. A water pick comprising:
a nozzle having a limiting groove;
a nozzle fixing assembly comprising:
   a locking assembly comprising a housing provided with a first through hole and an elastic element connected to the housing; and
   a support base comprising an elastic piece and a locking sleeve provided with a second through hole, wherein an outer periphery of the locking sleeve is provided with a latching groove in communication with the second through hole; wherein the nozzle extends through the first through hole and the second through hole and biases the elastic element, such that the limiting groove is aligned with the latching groove, the elastic piece is engaged in the limiting groove and the latching groove; and
a water pump assembly connected to the locking sleeve and capable of pumping water into the nozzle;
wherein the locking assembly further comprises a movable plate connected to the elastic element and accommodated in the first through hole, the movable plate is provided with a guiding hole in communication with the first through hole, the nozzle extends through the guiding hole and abuts against the movable plate to bias the elastic element.

10. The water pick according to claim 9, wherein the nozzle comprises a connecting portion and a water spraying portion connected to the connecting portion, an end of the water spraying portion adjacent to the connecting portion forms an expanding portion, the limiting groove is provided in the connecting portion, the connecting portion extends through the first through hole and extends into the second through hole, the expanding portion is capable of pressing the movable plate.

* * * * *